United States Patent
Obasih et al.

(10) Patent No.: US 9,780,418 B2
(45) Date of Patent: Oct. 3, 2017

(54) SYSTEM AND METHOD FOR BATTERY CELL THERMAL MANAGEMENT USING CARBON-BASED THERMAL FILMS

(71) Applicant: Johnson Controls Technology Company, Holland, MI (US)

(72) Inventors: Kem M. Obasih, Brookfield, WI (US); Richard M. DeKeuster, Racine, WI (US)

(73) Assignee: Johnson Controls Technology Company, Holland, MI (US)

( * ) Notice: Subject to any disclaimer, the term of this patent is extended or adjusted under 35 U.S.C. 154(b) by 137 days.

(21) Appl. No.: 14/524,798

(22) Filed: Oct. 27, 2014

(65) Prior Publication Data
US 2015/0118537 A1    Apr. 30, 2015

Related U.S. Application Data

(60) Provisional application No. 61/896,370, filed on Oct. 28, 2013.

(51) Int. Cl.
*H01M 10/655* (2014.01)
*H01M 10/613* (2014.01)
(Continued)

(52) U.S. Cl.
CPC ..... *H01M 10/5044* (2013.01); *H01M 2/0267* (2013.01); *H01M 2/0292* (2013.01); *H01M 2/1077* (2013.01); *H01M 10/5004* (2013.01); *H01M 10/5016* (2013.01); *H01M 10/613* (2015.04); *H01M 10/653* (2015.04);
(Continued)

(58) Field of Classification Search
USPC ......................................................... 429/413
See application file for complete search history.

(56) References Cited

U.S. PATENT DOCUMENTS

| 5,763,118 A | 6/1998 | Stafford et al. |
| 6,821,671 B2 | 11/2004 | Hinton et al. |

(Continued)

FOREIGN PATENT DOCUMENTS

| EP | 1278263 | 1/2003 |
| WO | 2013025608 | 2/2013 |

OTHER PUBLICATIONS

International Search Report & Written Opinion for PCT Application No. PCT/US2014/062574 mailed Feb. 10, 2015.
(Continued)

*Primary Examiner* — Osei Amponsah
(74) *Attorney, Agent, or Firm* — Fletcher Yoder, P.C.

(57) ABSTRACT

The present disclosure relates to thermal management in battery cells and battery modules. A thermal assembly for a battery cell includes a battery cell having a battery cell packaging and a thermal pouch formed from a continuous carbon-based thermal film. The thermal pouch is configured to contact both the battery cell packaging and one or more thermal management features of a battery module with a first side of the carbon-based thermal film. Accordingly, the first side of the carbon-based thermal film is configured to provide uninterrupted thermal pathways along the first side of the carbon-based thermal film between the battery cell packaging and the one or more thermal management features of the battery module.

25 Claims, 14 Drawing Sheets

(51) Int. Cl.
- *H01M 10/625* (2014.01)
- *H01M 2/02* (2006.01)
- *H01M 2/10* (2006.01)
- *H01M 10/653* (2014.01)
- *H01M 10/6555* (2014.01)
- *H01M 10/6554* (2014.01)

(52) U.S. Cl.
CPC ... *H01M 10/6554* (2015.04); *H01M 10/6555* (2015.04); *H01M 10/625* (2015.04); *H01M 2220/20* (2013.01)

(56) References Cited

U.S. PATENT DOCUMENTS

| | | |
|---|---|---|
| 7,531,270 B2 | 5/2009 | Buck et al. |
| 7,749,648 B2 | 7/2010 | Kim |
| 7,935,439 B2 | 5/2011 | Kim |
| 8,432,696 B2 | 4/2013 | Ribas et al. |
| 8,647,762 B2 | 2/2014 | Schwab et al. |
| 8,663,829 B2 | 3/2014 | Koetting et al. |
| 8,828,576 B2 | 9/2014 | Kumar et al. |
| 2009/0186270 A1* | 7/2009 | Harada ............... H01M 2/0267 429/185 |
| 2010/0028758 A1 | 2/2010 | Eaves et al. |
| 2010/0276132 A1* | 11/2010 | Payne ................. F28D 15/0266 165/169 |
| 2011/0059347 A1 | 3/2011 | Lee et al. |
| 2013/0115506 A1* | 5/2013 | Wayne ............. H01M 10/5044 429/120 |
| 2013/0183566 A1 | 7/2013 | Wayne et al. |
| 2013/0209858 A1 | 8/2013 | Schmitt et al. |
| 2014/0154549 A1 | 6/2014 | Wayne et al. |
| 2014/0170462 A1 | 6/2014 | Bender et al. |
| 2014/0248515 A1 | 9/2014 | Wayne et al. |

OTHER PUBLICATIONS

Smalc, Martin D., Innovations in Flexible Graphite for Thermal Management Applications, GrafTech International, Redefining Limits, 2012, pp. 1-33, http://meptec.org/Resources/06%20-%20GrafTech.pdf.

"PGS" Graphite Sheets, Panasonic, Dec. 5, 2013, pp. 16-22, http://industrial.panasonic.com/www-data/pdf/AYA0000/AYA0000CE2.pdf.

* cited by examiner

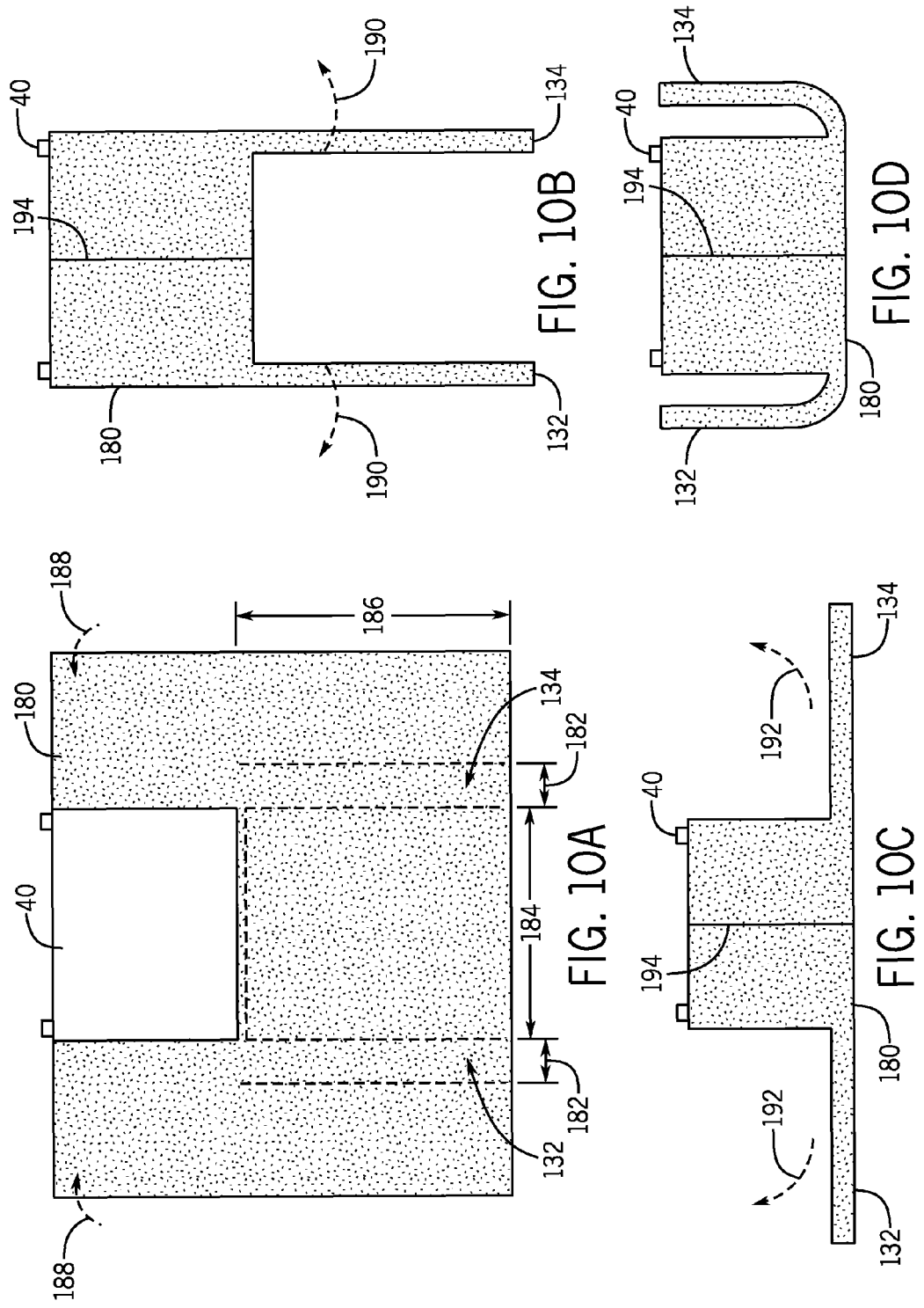

SYSTEM AND METHOD FOR BATTERY CELL THERMAL MANAGEMENT USING CARBON-BASED THERMAL FILMS

CROSS REFERENCE TO RELATED APPLICATIONS

This application claims priority from and the benefit of U.S. Provisional Application Ser. No. 61/896,370, entitled "A COOLING METHOD FOR LI-ION CELLS USING CARBON OR GRAPHITE FOIL MATERIALS", filed Oct. 28, 2013, which is hereby incorporated by reference in its entirety for all purposes.

BACKGROUND

The present disclosure relates generally to the field of batteries and battery modules. More specifically, the present disclosure relates to thermal management in battery cells and battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. One particular challenge when developing these types of battery modules is thermal management. For example, the individual battery cells of a battery module tend to heat during charging and/or discharging cycles. As such, the packaging of a battery module typically includes thermal management features, such as cooling plates and/or heat sinks, to dissipate into the external environment the heat produced by the internal battery cells.

Accordingly, it is now recognized that it is desirable to develop a battery module in which the battery cells are in good thermal contact with the thermal management features of the battery module. However, variations in the individual battery cells (e.g., due to manufacturing variability, surface deformities or irregularities, differences in the state of charge of the battery cells) can make it challenging to provide the desired thermal contact between the surfaces of the battery cells and the thermal management features during assembly of the battery module. Further, even when good thermal contact is provided between the battery cells and the thermal management feature at the time of manufacturing, successive expansion and contraction of the battery cells during operation may degrade or interrupt the thermal contact between the battery cells and the thermal management features over the life of the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to an embodiment of a thermal assembly for a battery cell, which includes a battery cell having a battery cell packaging and a thermal pouch formed from a continuous carbon-based thermal film. The thermal pouch is configured to contact both the battery cell packaging and one or more thermal management features of a battery module with a first side of the carbon-based thermal film. Accordingly, the first side of the carbon-based thermal film is configured to provide uninterrupted thermal pathways along the first side of the carbon-based thermal film between the battery cell packaging and the one or more thermal management features of the battery module.

The present disclosure also relates to an embodiment of a battery module that includes a plurality of battery cells disposed within a packaging of the battery module, wherein each of the plurality of battery cells includes a respective battery cell packaging and a respective thermal pouch. The battery module includes at least one thermal management feature associated with the packaging of the battery module, wherein the thermal management feature is configured to receive heat from the plurality of battery cells and to remove the heat from the packaging of the battery module. Further, each respective thermal pouch includes a carbon-based thermal film having a first side that contacts both the respective battery cell packaging and the at least one thermal management feature of the battery module.

The present disclosure further relates to an embodiment of a battery module. The battery module includes a battery cell disposed in or on a thermal pouch formed from a carbon-based thermal film, wherein the carbon-based thermal film includes a side that both contacts a packaging of the battery cell and forms a contact surface of a flap. The battery cell and the thermal pouch are together disposed inside a packaging of the battery module. Further, the contact surface of the flap of the thermal pouch is disposed against an internal surface of a thermal management feature associated with the packaging of the battery module.

DRAWINGS

Various aspects of this disclosure may be better understood upon reading the following detailed description and upon reference to the drawings in which.

Figure 7:
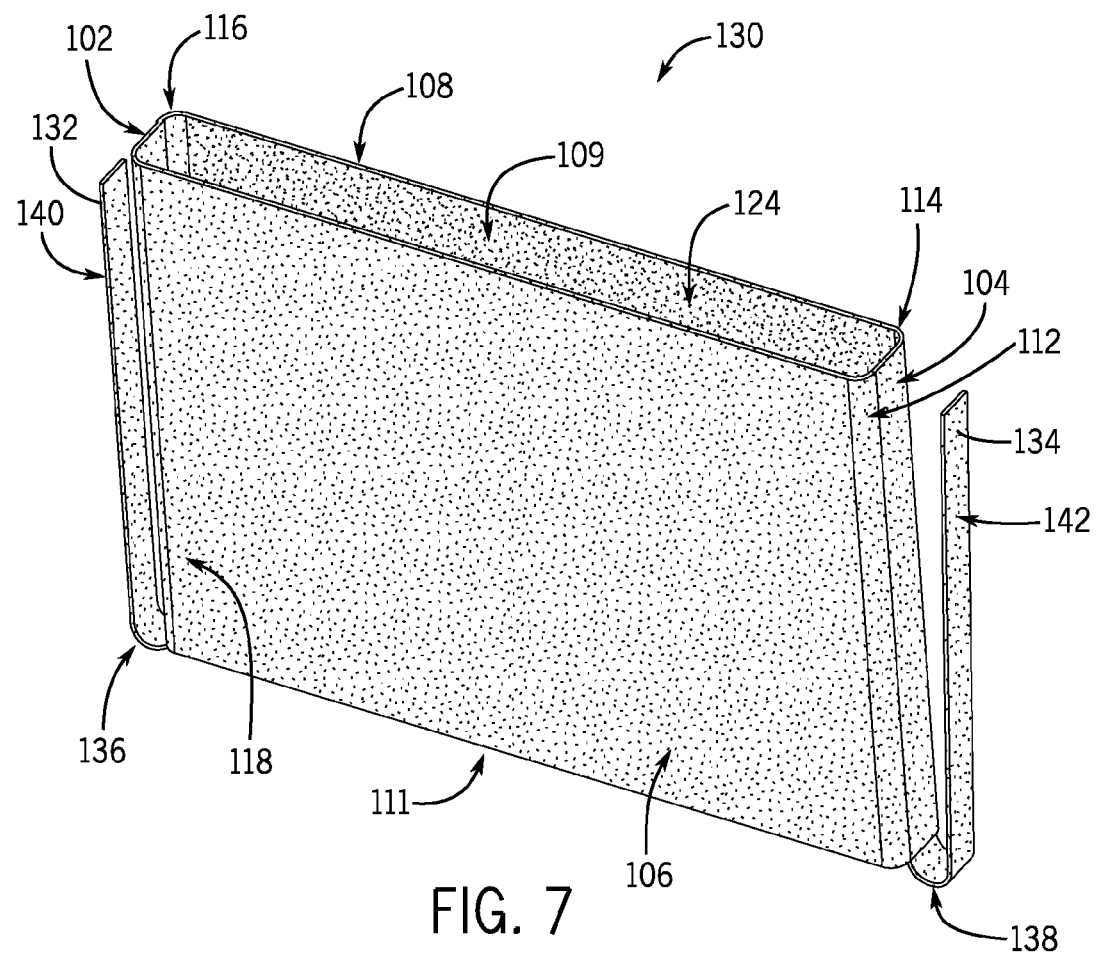
FIG. 7 is a perspective view of a thermal pouch for use with a prismatic battery cell, in accordance with another embodiment of the present approach.
Figure 11A:
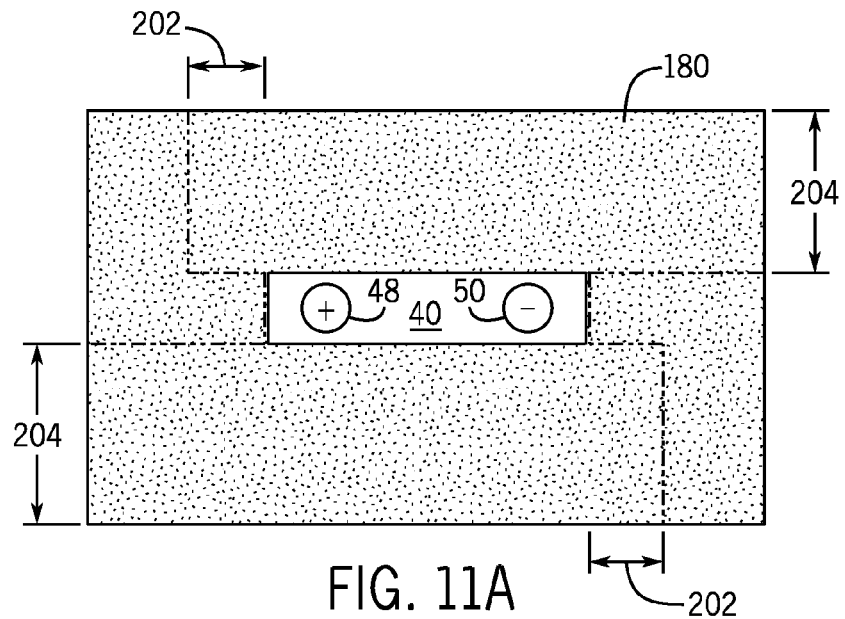
Figure 11B:
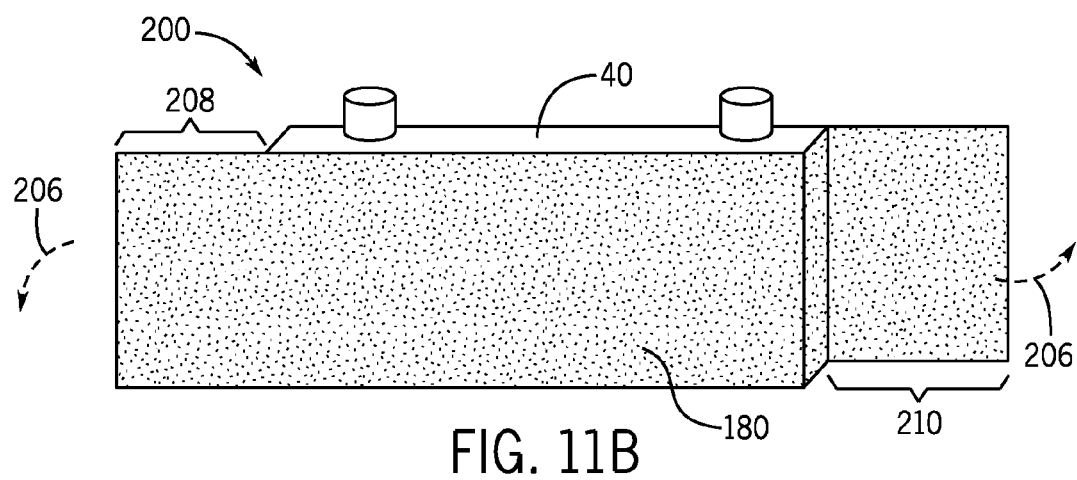
Figure 12:
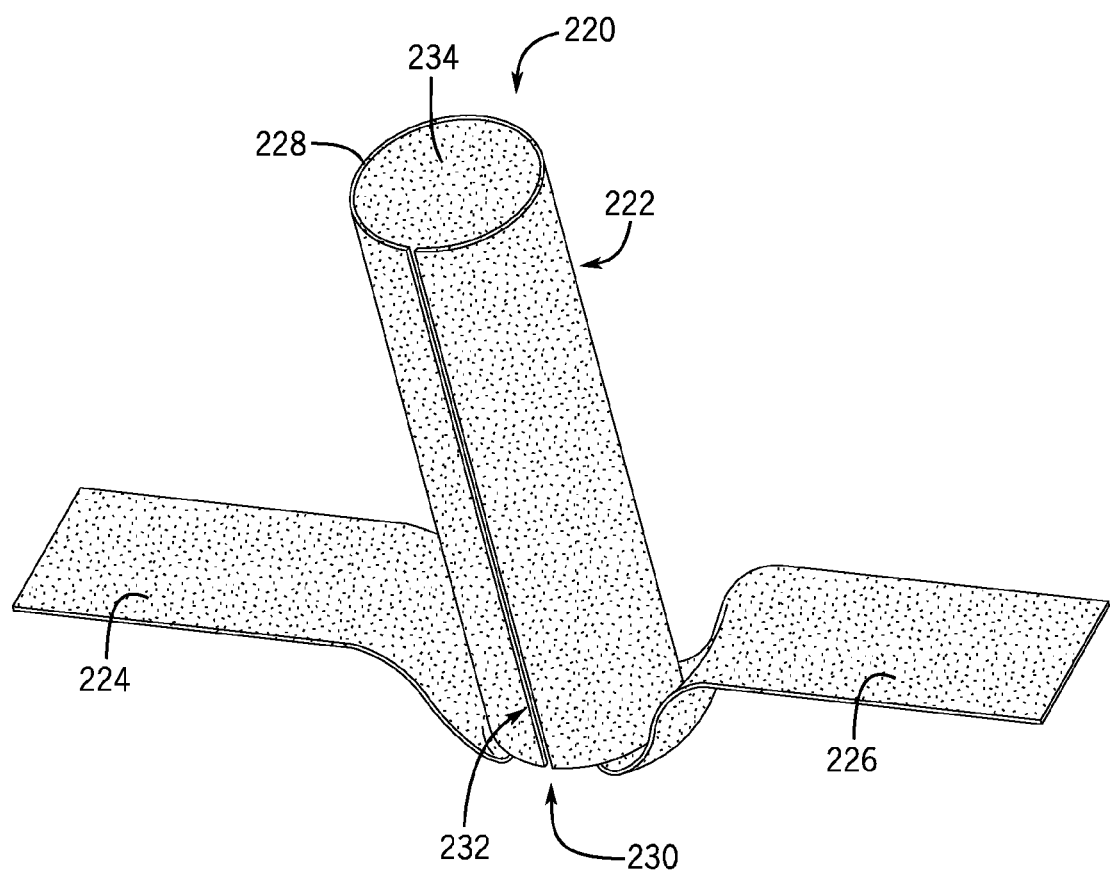
Figure 13:
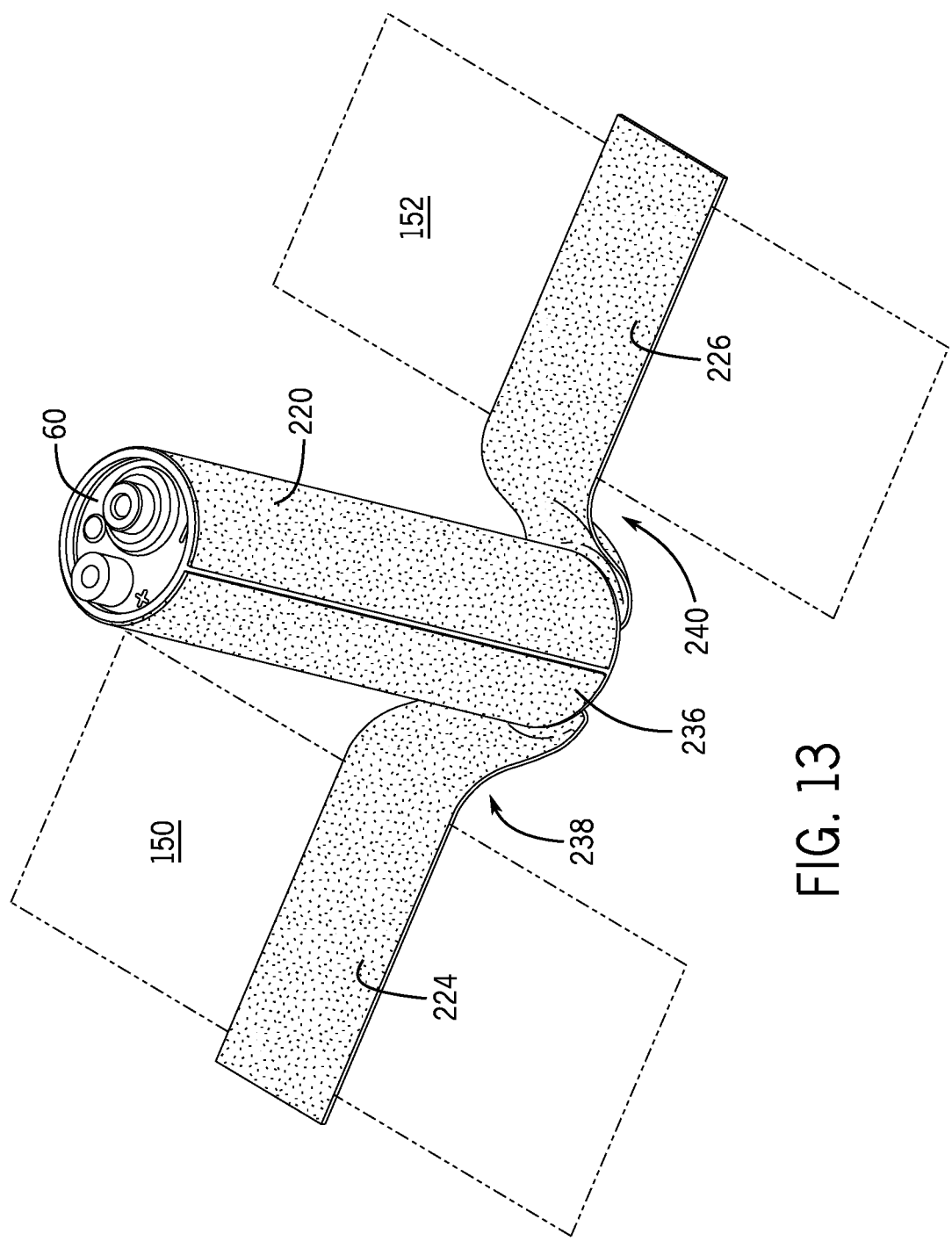
Figure 15:
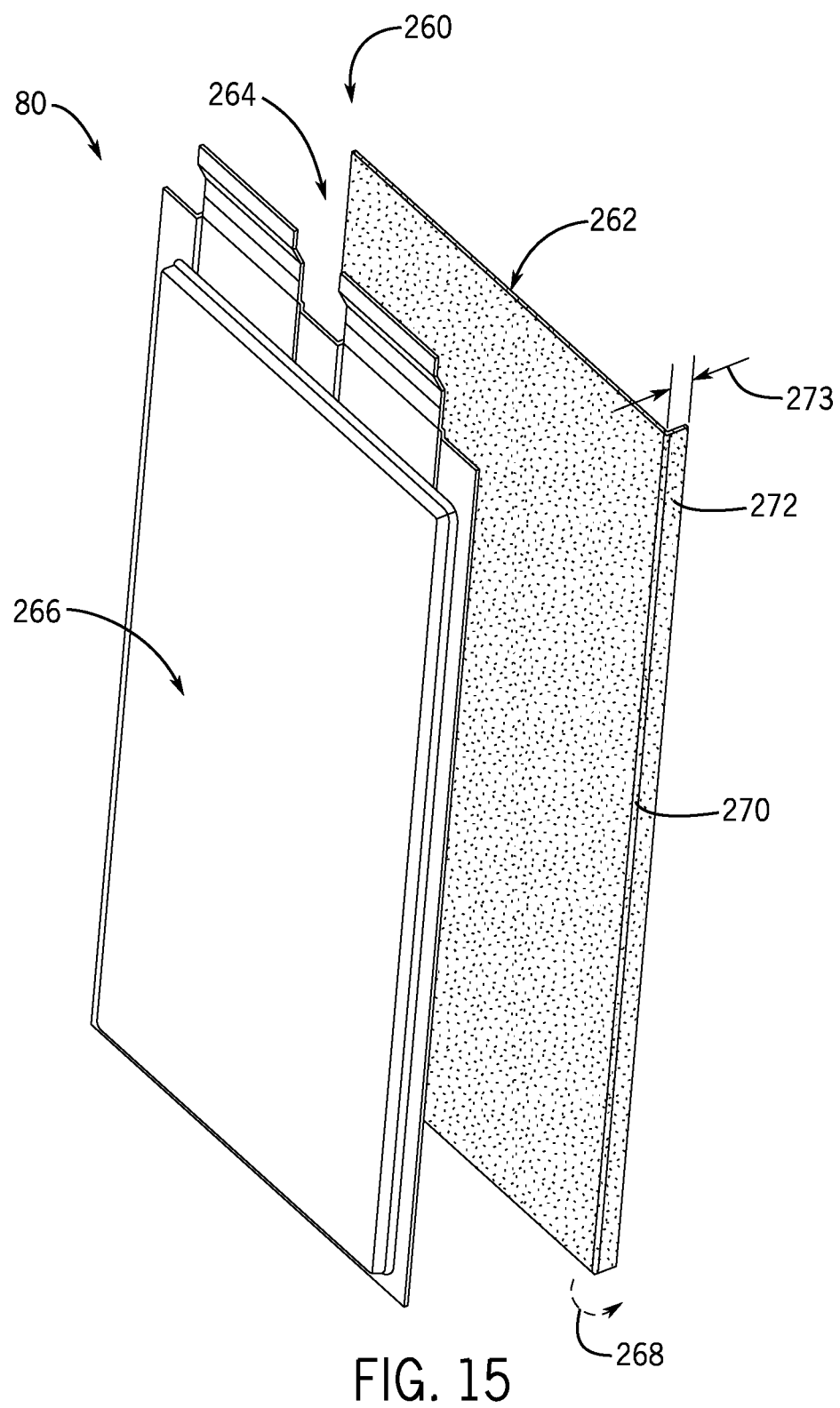
Figure 16:
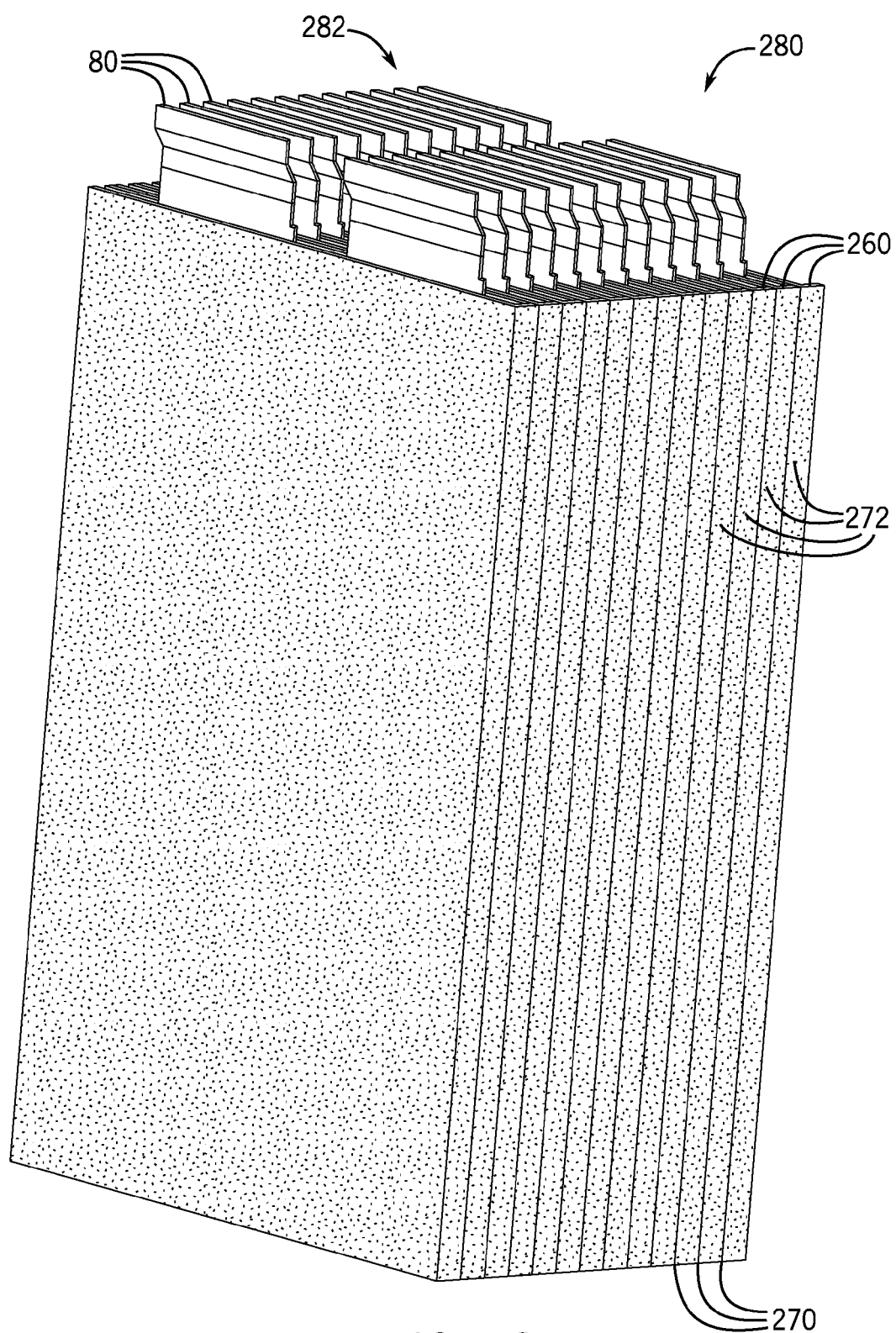

FIGS. 10A-D are schematic diagrams illustrating forming the thermal pouch of FIG. 7 from a single sheet of carbon-based thermal film, in accordance with an embodiment of the present approach;

FIGS. 11A-B are schematic diagrams illustrating forming another thermal pouch from a single sheet of carbon-based thermal film, in accordance with an embodiment of the present approach;

FIG. 12 is a perspective view of a thermal pouch for use with a cylindrical battery cell, in accordance with an embodiment of the present approach;

FIG. 13 is a schematic diagram illustrating a cylindrical battery cell disposed in the thermal pouch of FIG. 12, in accordance with an embodiment of the present approach;

FIGS. 14A-C are schematic diagrams illustrating forming the thermal pouch of FIG. 12 from a single sheet of carbon-based thermal film, in accordance with an embodiment of the present approach;

FIG. 15 is a perspective view of a pouch battery cell and a thermal pouch for use with the pouch battery cell, in accordance with an embodiment of the present approach; and FIG. 16 is a perspective view of a portion of a battery module that includes a stack of pouch battery cells that are each disposed in the thermal pouch of FIG. 15, in accordance with an embodiment of the present approach.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of prismatic battery cells (e.g., Lithium-ion (Li-ion) electrochemical cells) arranged to provide particular voltages and/or currents useful to power, for example, one or more components of an xEV. The battery cells may have a variety of shapes and sizes, and the present disclosure is intended to generally apply to all of these variations as appropriate.

As set forth above, the packaging of a battery module may include thermal management features, such as cooling plates and/or heat sinks, to dissipate the heat produced by the battery cells of the battery module. However, while it may be desirable for the battery cells to be in good thermal contact with these thermal management features, as set forth above, directly contacting the packaging of the battery cells and the packing of the battery module may be problematic from a design standpoint. For example, placing a battery cell in direct contact with such thermal management features may provide the thermal pathway of least resistance to dissipate this heat. However, directly contacting the packaging of the battery cells and the packaging of the battery module may not be possible or desirable from an electrical standpoint when the packaging of the battery cells and the packaging of the battery module are both electrically conductive, especially in situations in which the packaging of the battery cells has a potential (e.g., battery cells with non-neutral cans or packaging). Furthermore, designing a battery module in which the battery cells are tightly packed to provide and maintain effective contact with such thermal management features can also be challenging considering the variability in the dimensions of battery cells due to variability in manufacturing, temperature, and/or state of charge (SOC) of the battery cells.

With this in mind, present embodiments are directed toward systems and methods for providing a thermal pathway between each individual battery cell of a battery module and a thermal management feature of the packaging of the battery module using a carbon-based thermal film. The disclosed systems and methods include designs that enable the use of a single, continuous carbon-based thermal film to form a thermal pouch around a portion of the packaging of a battery cell, such as a prismatic, cylindrical, or pouch battery cell, of a battery module. These thermal pouches are designed such that the same surface (i.e., same side) of the thermal film is in direct contact with the packaging of the battery cell and also in direct contact with the thermal management feature of the battery module, which enables efficient conduction of heat within the plane (as opposed to through the thickness) of the carbon-based thermal film. Accordingly, in certain embodiments discussed below, the disclosed thermal pouch designs provide good heat conduction and good electrical resistance, enable greater robustness toward battery cell variability, and are easily modified to accommodate different battery module designs having thermal management features in different positions on the battery module packaging. Further, the disclosed thermal pouch designs are easy to manufacture and do not add substantial weight or cost to the battery module.

Figure 1:
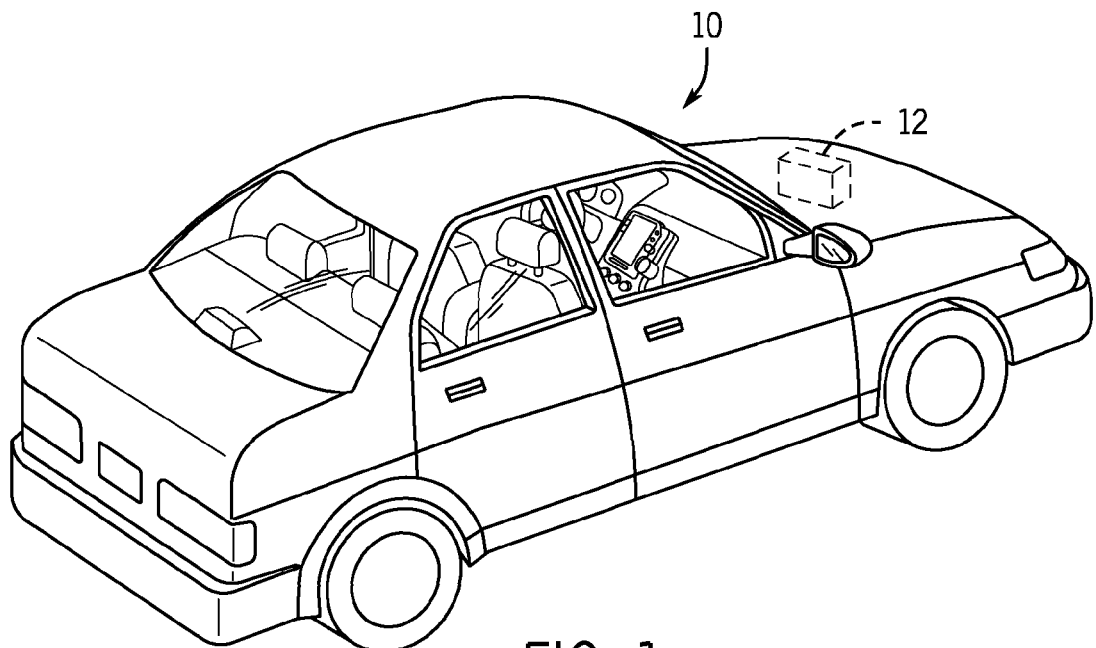
FIG. 1 is a perspective view of a vehicle having a battery module configured in accordance with present embodiments to provide power for various components of the vehicle.

With the foregoing in mind, present embodiments relating to the use of carbon-based thermal films and associated features may be applied in any number of energy expending systems (e.g., vehicular contexts and stationary power contexts). To facilitate discussion, embodiments of the battery modules described herein are presented in the context of advanced battery modules (e.g., Li-ion battery modules) employed in xEVs. To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
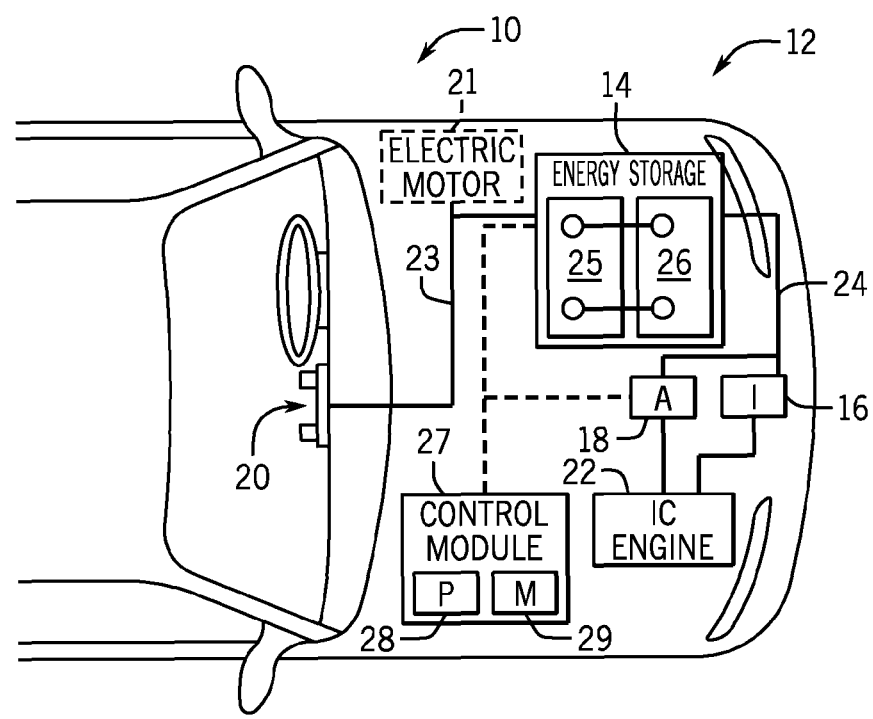
FIG. 2 is a cutaway schematic view of the vehicle and the battery module of FIG. 1, in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 21. Generally, the energy storage component 14 may capture/store electrical energy generated in the vehicle 10 and output electrical energy to power electrical devices in the vehicle 10. In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 22.

Additionally, the energy storage component 14 may capture electrical energy generated by the alternator 18 and/or the electric motor 21. In some embodiments, the alternator 18 may generate electrical energy while the internal combustion engine 22 is running. More specifically, the alternator 18 may convert the mechanical energy produced by the rotation of the internal combustion engine 22 into electrical energy. Additionally or alternatively, when the vehicle 10 includes an electric motor 21, the electric motor 21 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 21 during regenerative braking. As such, the alternator and/or the electric motor 21 are generally referred to herein as a regenerative braking system.

To facilitate capturing and supplying electric energy, the energy storage component 14 may be electrically coupled to the vehicle's electric system via a bus 24. For example, the bus 24 may enable the energy storage component 14 to receive electrical energy generated by the alternator 18 and/or the electric motor 21. Additionally, the bus may enable the energy storage component 14 to output electrical energy to the ignition system 16 and/or the vehicle console 20. Accordingly, when a 12 volt battery system 12 is used, the bus 24 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 25 and a lead-acid (e.g., a second) battery module 26, which each includes one or more battery cells. In other embodiments, the energy storage component 14 may include any number of battery modules. Additionally, although the lithium ion battery module 25 and lead-acid battery module 26 are depicted adjacent to one another, they may be positioned in different areas around the vehicle. For example, the lead-acid battery module 26 may be positioned in or about the interior of the vehicle 10 while the lithium ion battery module 25 may be positioned under the hood of the vehicle 10.

In some embodiments, the energy storage component 14 may include multiple battery modules to utilize multiple different battery chemistries. For example, when the lithium ion battery module 25 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 27. More specifically, the control module 27 may control operations of components in the battery system 12, such as relays (e.g., switches) within energy storage component 14, the alternator 18, and/or the electric motor 21. For example, the control module 27 may regulate amount of electrical energy captured/supplied by each battery module 25 or 26 (e.g., to de-rate and re-rate the battery system 12), perform load balancing between the battery modules 25 and 26, determine a state of charge of each battery module 25 or 26, determine temperature of each battery module 25 or 26, control voltage output by the alternator 18 and/or the electric motor 21, and the like.

Accordingly, the control module 27 may include one or more processors 28 and one or more memory 29. More specifically, the one or more processors 28 may include one or more application specific integrated circuits (ASICs), one or more field programmable gate arrays (FPGAs), one or more general purpose processors, or any combination thereof. Additionally, the one or more memory 29 may include volatile memory, such as random access memory (RAM), and/or non-volatile memory, such as read-only memory (ROM), optical drives, hard disc drives, or solid-state drives. In some embodiments, the control module 27 may include portions of a vehicle control unit (VCU) and/or a separate battery control module. Furthermore, as depicted, the lithium ion battery module 25 and the lead-acid battery module 26 are connected in parallel across their terminals. In other words, the lithium ion battery module 25 and the lead-acid module 26 may be coupled in parallel to the vehicle's electrical system via the bus 24.

Figure 3:
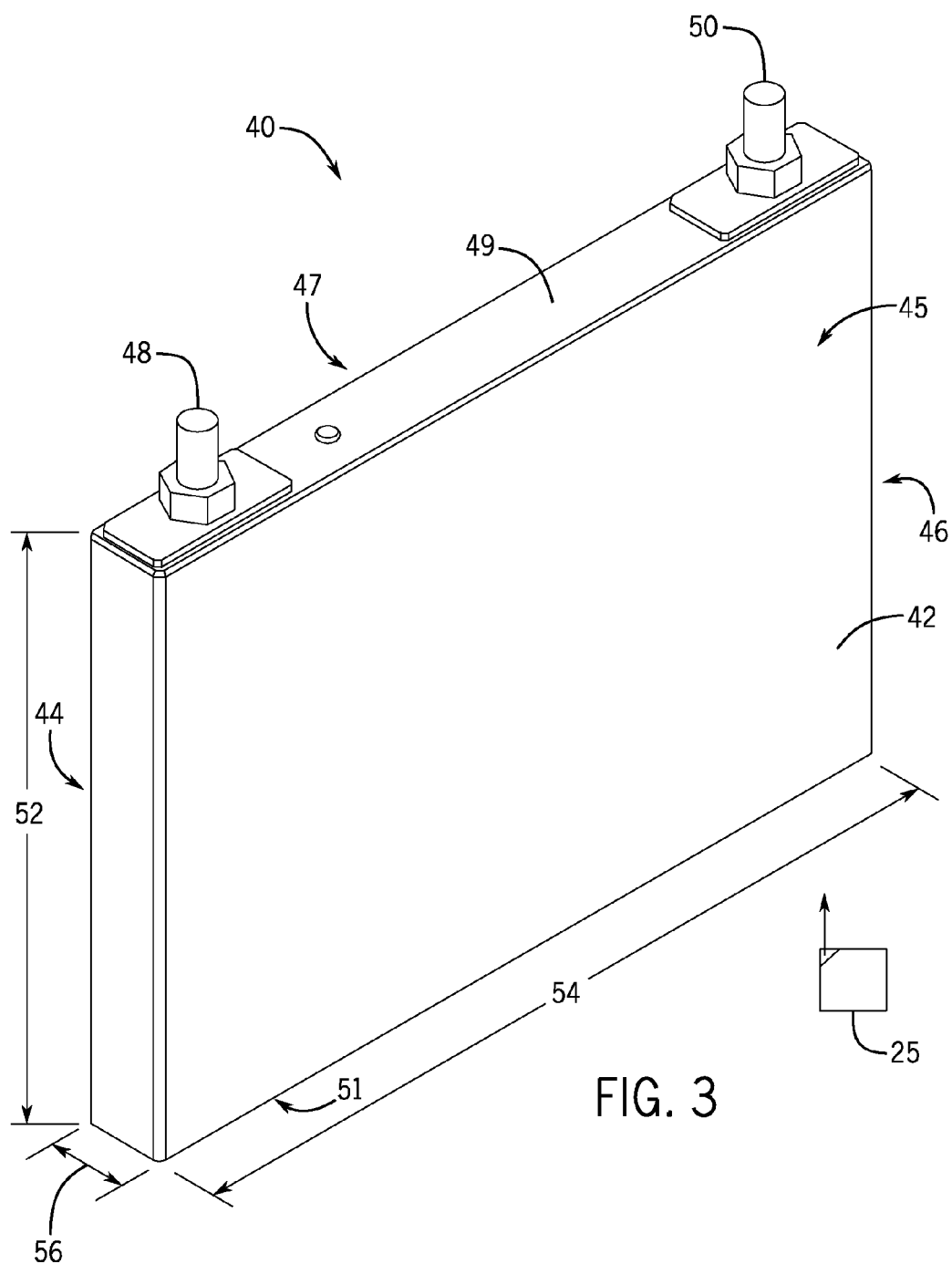
FIG. 3 is a perspective view of a prismatic battery cell, in accordance with an embodiment of the present approach.
Figure 4:
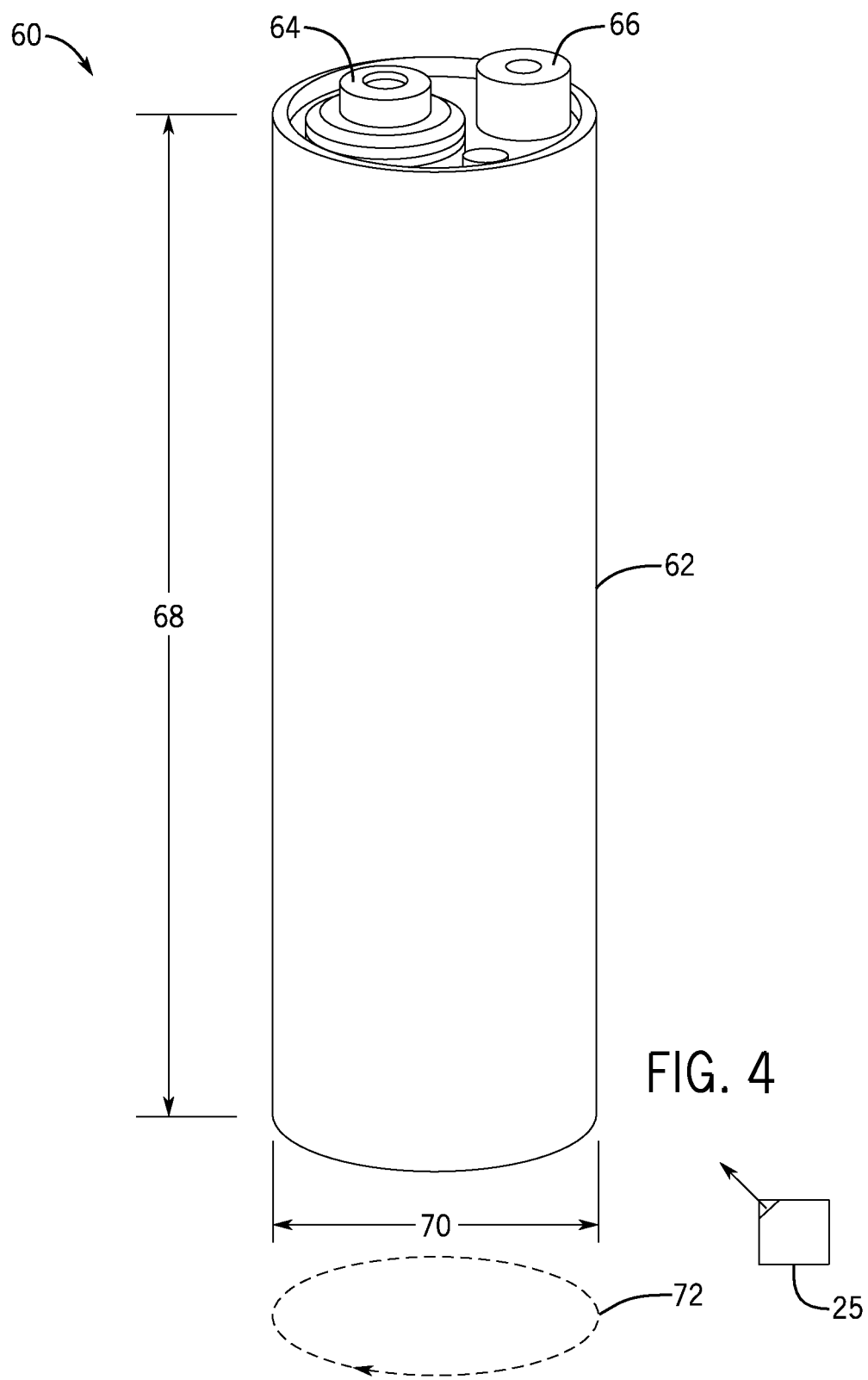
FIG. 4 is a perspective view of a cylindrical battery cell, in accordance with an embodiment of the present approach.
Figure 5:
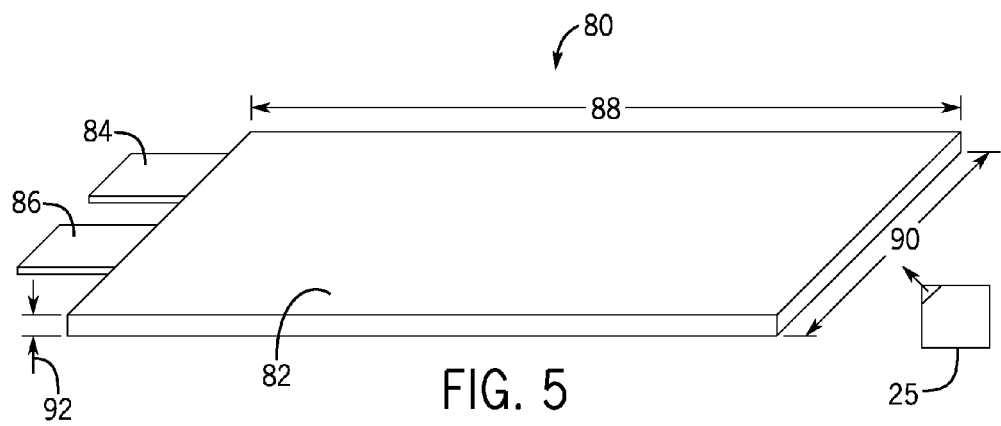
FIG. 5 is a perspective view of a pouch battery cell, in accordance with an embodiment of the present approach.

The lithium ion battery module 25 described herein, as noted, may include any suitable number of lithium ion electrochemical battery cells electrically coupled to provide particular currents and/or voltages to provide power to the xEV 10. With the foregoing in mind, FIGS. 3-5 illustrate examples of lithium ion battery cells that may be used with the presently disclosed technique. In certain embodiments, the battery module 25 illustrated in FIGS. 1 and 2 may include a suitable number (e.g., 2, 3, 4, 5, 6, 7, 8, 9, 10, or more) of the battery cells illustrated in FIGS. 3-5, each configured to store and deliver electrical energy. It should be appreciated that the battery cells illustrated in FIGS. 3-5 are merely provided as examples. In other embodiments, other shapes (e.g., oval, prismatic, polygonal, etc.), sizes, terminal configuration, and other features may also be used for battery cells without spoiling the effect of the present approach.

Generally speaking, the illustrated battery cells illustrated in FIGS. 3-5 each have a battery cell packaging that encloses and contains the internal components of the battery cell including the anode and cathode materials and an electrolyte. As used herein, the "packaging" of a battery cell refers to the metal or polymer outer container or housing that contains the internal components (e.g., anode, cathode, electrolyte) of the battery cell. In certain embodiments, the packaging of the battery cells illustrated in FIGS. 3-5 may be substantially non-conductive, or conductive without substantial polarity (i.e., a "neutral can"), or conductive with a positive or negative polarity. Additionally, in certain embodiments, the anode and cathode within the battery cells illustrated in FIGS. 3-5 may be present in the form of a "jelly-roll" or as an alternating stack of plates. Further, the battery cells illustrated in FIGS. 3-5 may be any suitable type of lithium ion electrochemical cell, including but not limited to lithium nickel manganese cobalt oxide (NMC) and lithium titanate (LTO) battery cells, NMC/graphite battery cells, and so forth. Indeed, the present disclosure is not intended to be limited to a particular combination of cathode and anode active materials and, indeed, is intended to be compatible with any appropriate combination of active materials.

FIG. 3 illustrates an embodiment of a prismatic lithium ion battery cell 40, which is a component of the lithium ion battery module 25, in accordance with present embodiments. The illustrated prismatic battery cell 40 includes a metallic packaging 42 that may have a positive, negative, or neutral polarity in different embodiments. The illustrated packaging 42 includes flat end portions 44 and 46 and flat side portions 45 and 47, providing the prismatic battery cell 40 with a generally rectangular prism shape. In other embodiments, as discussed below, the prismatic battery cell 40 may instead include rounded end portions 44 and 46 without negating the effect of the present approach. The illustrated prismatic battery cell 40 includes a negative terminal 48 and a positive terminal 50 disposed on a top portion 49 of the packaging 42, opposite a bottom portion 51 of the prismatic battery cell 40. The terminals 48 and 50 are respectively coupled to the anode and cathode disposed within the packaging 42 of the battery cell 40. In terms of dimensions, the illustrated prismatic battery cell 40 may be described as having a particular height 52, a particular width 54, and a particular thickness 56.

FIG. 4 illustrates an embodiment of a cylindrical lithium ion battery cell 60, which is a component of the lithium ion battery module 25, in accordance with present embodiments. The cylindrical battery cell 60 includes a metallic packaging 62 that may have a positive, negative, or neutral polarity in different embodiments. The illustrated cylindrical lithium ion battery cell 60 includes a negative terminal 64 and a positive terminal 66 that are respectively coupled to the anode and the cathode disposed within the packaging 62 of the battery cell 60. In terms of dimensions, the cylindrical battery cell 60 illustrated in FIG. 4 may be described as having a particular height 68, a particular diameter 70, and a particular circumference 72.

FIG. 5 illustrates an embodiment of a pouch lithium ion battery cell 80, which is a component of the lithium ion battery module 25, in accordance with present embodiments. The illustrated pouch battery cell 80 has a non-conductive, polymeric packaging 82. The illustrated pouch lithium ion battery cell 80 includes a negative tab terminal 84 and a positive tab terminal 86 respectively coupled to the anode and cathode disposed within the polymer packaging 82 of the battery cell 80. In terms of dimensions, the illustrated pouch battery cell 80 may be described as having a particular height 88, a particular width 90, and a particular thickness 92.

As mentioned above, present embodiments are directed towards systems and methods for using a carbon-based thermal film to thermally couple a battery cell, like those illustrated in FIGS. 3-5, and the thermal management features (e.g., heat sinks, cooling plates) of the battery module. As such, this carbon-based thermal film may, in certain embodiments, enable the manufacture of battery modules in which the battery cells and the thermal management feature are not in direct, physical contact with one another, but rather the battery cells are thermally coupled to (and electrically insulated from) the thermal management feature by the carbon-based thermal film. Further, since the disclosed carbon-based thermal films efficiently shuttle heat from the battery cells to the thermal management feature, the presently disclosed designs may lack certain other thermal management features (e.g., phase-change materials) that may be used by other battery modules.

As used herein, a "carbon-based thermal film" may refer to any conformable (e.g., flexible, bendable) film that conducts heat via one or more graphene sheets (e.g., graphite or graphitic layers, sheets of carbon having a generally $sp^2$ hybridization) that are aligned along the plane of the film. In certain embodiments, the carbon-based thermal film may be made entirely of the graphene sheets, while in other embodiments, the graphene sheets may form a layer disposed within or along the surface of a multilayer structure. Accordingly, the carbon-based thermal film may, in certain embodiments, include any suitable number of support layers, adhesive layers, electrically insulating layers surrounding or supporting the one or more graphene sheets of the carbon-based thermal film. For example, in certain embodiments, the disclosed carbon-based thermal films may include one or more electrically insulating layers to aid in electrically isolating the battery cells from one another and/or the packaging of the battery module.

Graphene sheets are excellent at conducting heat through their planar structure. Since the graphene sheets generally are oriented along the plane of the carbon-based thermal film, the thermal conductivity of the disclosed carbon-based thermal films is significantly higher (e.g., at least an order of magnitude greater) along the plane of the thermal film when compared to the thermal conductivity across the thickness of the film. As such, it may be appreciated that, when heat generated by the battery cells enters a carbon-based thermal film and reaches the graphene sheets, the low thermal resistance along the plane of the graphene sheets causes the heat to rapidly disperse along the plane of the thermal film. Since the thermal resistivity is generally higher across the entire thickness of the carbon-based thermal film due to the greater thermal resistance provided by the one or more support layers, adhesive layers, electrically insulating layers surrounding or supporting graphene sheets, heat preferably moves along the plane of the thermal film (i.e., along the plane of graphene sheets) to reach the thermal management feature. As such, one aspect of the present approach is using the same side of the carbon-based thermal film to contact both the surface of a battery cell and the surface of the thermal management feature so that the thermal pathway that is created between the battery cell and the thermal management feature does not involve the heat traversing the entire thickness of the carbon-based thermal film. That is, while the heat may, in certain embodiments, traverse one or more layers of a multilayer carbon-based thermal film to reach the graphene sheets, once the heat has dispersed along the plane of the thermal film, the heat may traverse the same layers of the multilayer thermal film (as opposed to all of the layers of the thermal film) to reach the thermal management feature.

A non-limiting list of example carbon-based thermal films include: graphene, graphite, compressed exfoliated graphite, graphitized polyimide, graphite-based laminates, and pyrolytic graphite sheets (PGS). As discussed in greater detail below, certain carbon-based thermal films can provide a thermal conductivity that is roughly equivalent to that of copper, while others can provide an in-plane thermal conductivity that is two to five times greater than that of copper at a fraction of the weight. Specific examples of carbon-based thermal films include pyrolytic graphite sheets (PGS) available from the Panasonic Corporation, Kadoma, Japan. For example, the properties of an example PGS are presented in Table 1. It may be appreciated that, while the example PGS of Table 1 provides an in-plane thermal conductivity that is 240 W/m-K, other PGS films may have conductivity as high as 500 W/m-K, 1000 W/m-K, 1500 W/m-K, 1750 W/m-K, or even 1950 W/m-K.

TABLE 1

Properties for an example carbon-based thermal film.

| Thermal Properties | | |
|---|---|---|
| Coefficient of Thermal Expansion, Linear | −0.4 μm/m -° C. | In Plane |
| Specific Heat | 711 J/Kg-° C. | |
| Thermal Conductivity | 240 W/m-K | In-Plane |
|  | 6.00 W/m-K | Through Thickness |
| Physical Properties | | |
| Thickness | 127 μm | |
| Electrical Properties | | |
| Electrical Resistivity | 0.0010 Ohm-cm | In-Plane |
|  | 1.5 Ohm-cm | Through-Thickness |

As used herein, a "thermal pouch" refers to a carbon-based film that is designed to contact at least a portion of the packaging of a battery cell and at least a portion of a thermal management feature (e.g., a heat sink, a cold plate) of the battery module. In general, the disclosed thermal pouches include at least one flap that is designed to contact the thermal management feature. More specifically, as mentioned, the thermal pouches are generally designed such that the same side of the carbon-based thermal film contacts the packaging of the battery cell and forms the portion of the at least one flap that contacts the thermal management feature. By using the same side of the carbon-based thermal film, the in-plane thermal conductivity dominates thermal transport, ensuring efficient transfer of heat through the carbon-based thermal film.

It may be appreciated that the disclosed carbon-based thermal films are able to conform to the surfaces of the battery cell packaging and the thermal management feature to ensure good thermal contact despite irregularities and/or deformities in the surfaces of these components. Further, the conformable nature of the disclosed carbon-based thermal films provides greater freedom at the time a battery module is assembled since the thermal contact between the components is not rigidly dependent on uniform battery cell size and tight packing to provide efficient thermal pathways to cool the battery cells. It may also be appreciated that, as discuss in greater detail below, the flexible nature of the disclosed carbon-based thermal films enables certain disclosed thermal pouch designs to flex and bend to maintain thermal contact between the battery cell and the thermal management features of the battery module despite successive thermal expansion and contraction of the battery cell and/or the thermal pouch during operation of the battery module.

It may also be appreciated that the disclosed thermal pouches may be formed using a single piece of carbon-based film such that there are continuous, uninterrupted thermal pathways along the plane of carbon-based film to encourage efficient thermal transfer between the battery cell and the thermal management feature. For example, as discussed in greater detail below, in certain embodiments, the carbon-based thermal film may be cut and folded around the battery cell to form the thermal pouch. In other embodiments, the thermal pouch may include seams in which portions of the carbon-based film may be affixed (e.g., welded, adhered) to itself. In other embodiments, the thermal pouch may be adhered to the packaging of the battery cell and/or the thermal feature. In still other embodiments, the thermal pouch may include a thermal paste or similar thermal interface compound between the carbon-based thermal film, the packaging of the battery cell, and/or the thermal management feature. However, it may be appreciated that embodiments that lack adhesives and/or thermal paste may afford process advantages (e.g., cleaner, fewer components, fewer steps, etc.) over other embodiments.

Figure 14:
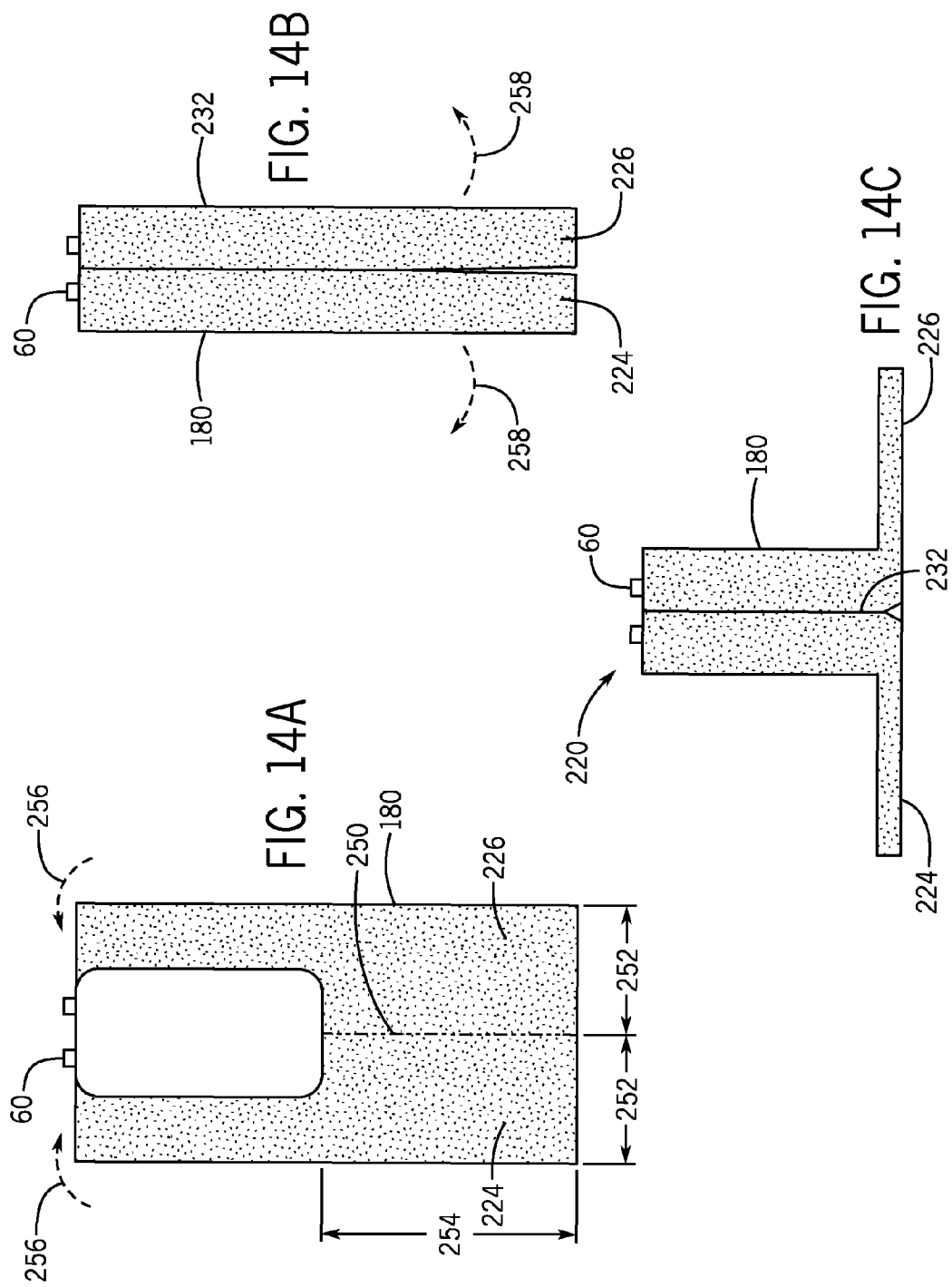

With the foregoing in mind, FIGS. 6-11 illustrate various views and aspects of embodiments of thermal pouches for use with prismatic battery cells, such as the prismatic battery cell 40 illustrated in FIG. 3. FIGS. 12-14 illustrate various views and aspects of an embodiment of a thermal pouch for use with cylindrical battery cells, such as the cylindrical battery cell 60 illustrated in FIG. 4. FIGS. 15-16 illustrate various views and aspects of an embodiment of a thermal pouch for use with pouch battery cells, such as the pouch battery cell 80 illustrated in FIG. 5. It may be appreciated that, while certain aspects of the disclosed thermal pouches may be described with respect to a particular battery cell type (e.g., prismatic, cylindrical, or pouch), these aspects may be applicable to thermal pouches for other battery cell types, shapes, and arrangements.

Figure 6:
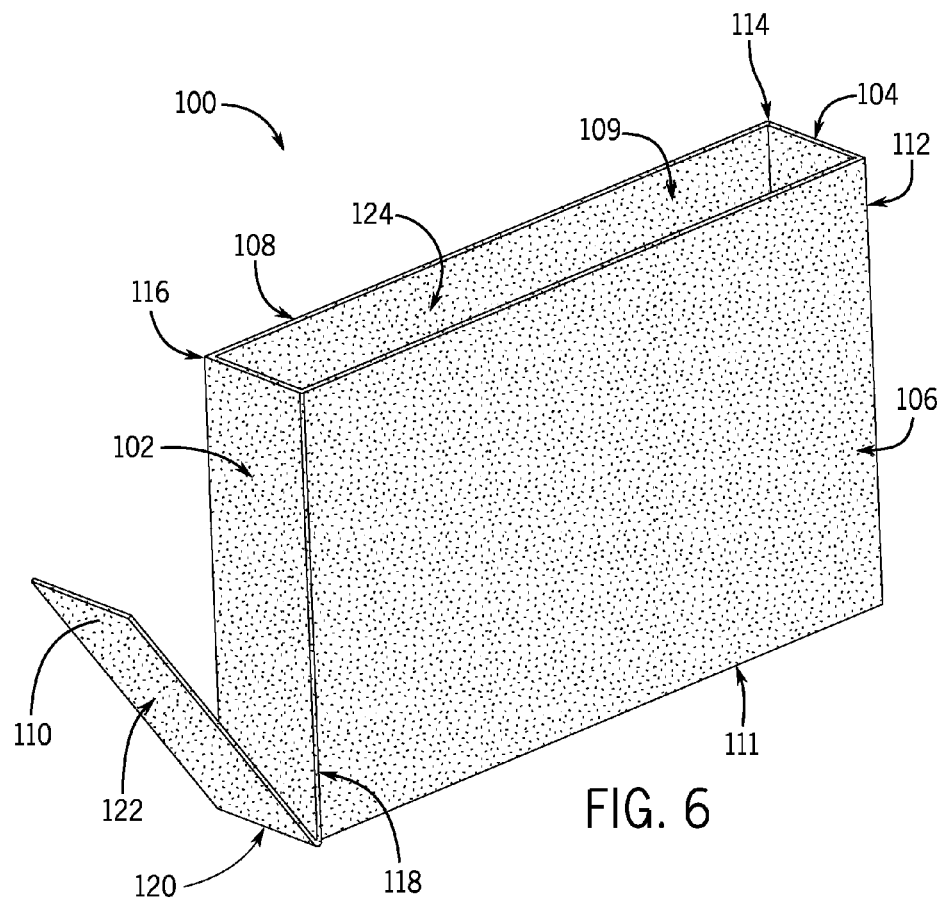
FIG. 6 is a perspective view of a thermal pouch for use with a prismatic battery cell, in accordance with an embodiment of the present approach.

FIG. 6 illustrates an embodiment of a thermal pouch 100 made from a carbon-based thermal film for use with a prismatic battery cell, such as the prismatic battery cell 40 of FIG. 3. Accordingly, the thermal pouch 100 illustrated in FIG. 6 has generally the same rectangular prism shape as the prismatic battery cell 40 illustrated in FIG. 3. For example, the thermal pouch 100 includes substantially flat end portions 102 and 104, which correspond to the flat end portions 44 and 46 of the prismatic battery cell 40 of FIG. 3, and substantially flat side portions 106 and 108, which correspond to the flat end portions 45 and 47 of the prismatic battery cell 40 of FIG. 3. Additionally, the thermal pouch 100 illustrated in FIG. 6 includes a single flap 110 that extends outwardly from the bottom of the flat end portion 102. For the thermal pouch 100 illustrated in FIG. 6, the top and bottom portions 109 and 111 are open (i.e., not covered by the carbon-based thermal film). It may be appreciated that the various corners of the illustrated thermal pouch 100 (e.g., corners 112, 114, 116, 118, and 120) are intended to demonstrate folds or bends in a continuous sheet of the carbon-based thermal film. In other words, the various corners 112, 114, 116, 118, and 120 illustrated in the thermal pouch 100 should not be construed as seams in the thermal pouch 100. It may be appreciated that, for the illustrated thermal pouch 100, the surface 122 of the flap 110 that is designed to contact the thermal management feature of the battery module (as discussed below) and the surface 124 that is designed to contact the packaging of the battery cell are part of the same side of the carbon-based thermal film. As described above, since in-plane thermal conduction dominates in the carbon-based thermal film, the disclosed thermal pouch 100 provides low resistance thermal pathways between the battery cell and the thermal management feature by avoiding transferring heat across the entire thickness of the carbon-based thermal film.

FIG. 7 illustrates another embodiment of a thermal pouch 130 made from a carbon-based thermal film for use with a prismatic battery cell, similar to the prismatic battery cell 40 of FIG. 3, but instead having rounded end portions 44 and 46. For example, the thermal pouch 130 includes substantially rounded end portions 102 and 104 and substantially flat side portions 106 and 108. Additionally, the thermal pouch 130 includes two flaps 132 and 134 that extend outwardly from the bottom of the rounded portions 102 and 104, respectively. Unlike the thermal pouch 100 of FIG. 6, the two flaps 132 and 134 include bends or curves 136 and 138, respectively, such that the two flaps 132 and 134 may be positioned substantially parallel to the end portions 102 and 104, or disposed at other angles based on the positions of the thermal management features of the battery module. Like the thermal pouch 100 of FIG. 6, the top and bottom portions 109 and 111 are open (i.e., not covered by the carbon-based thermal film) for the thermal pouch 130 illustrated in FIG. 7. It may be appreciated that the various corners of the illustrated thermal pouch 130 (e.g., corners 112, 114, 116, and 118) are intended to demonstrate folds or bends in a continuous sheet of the carbon-based thermal film and should not be construed as seams in the thermal pouch 130. It may be appreciated that, for the illustrated thermal pouch 130, the surfaces 140 and 142 of the flaps 132 and 134 that are designed to contact the thermal management features of the battery module (as discussed below) and the surface 124 that is designed to contact the packaging of the battery cell are formed from the same side of the carbon-based thermal film. As described above, since in-plane thermal conduction dominates in the carbon-based thermal film, the disclosed thermal pouch 130 provides low resistance thermal pathways between the battery cell and the thermal management feature by avoiding transferring heat across the entire thickness of the carbon-based thermal film.

Figure 8:
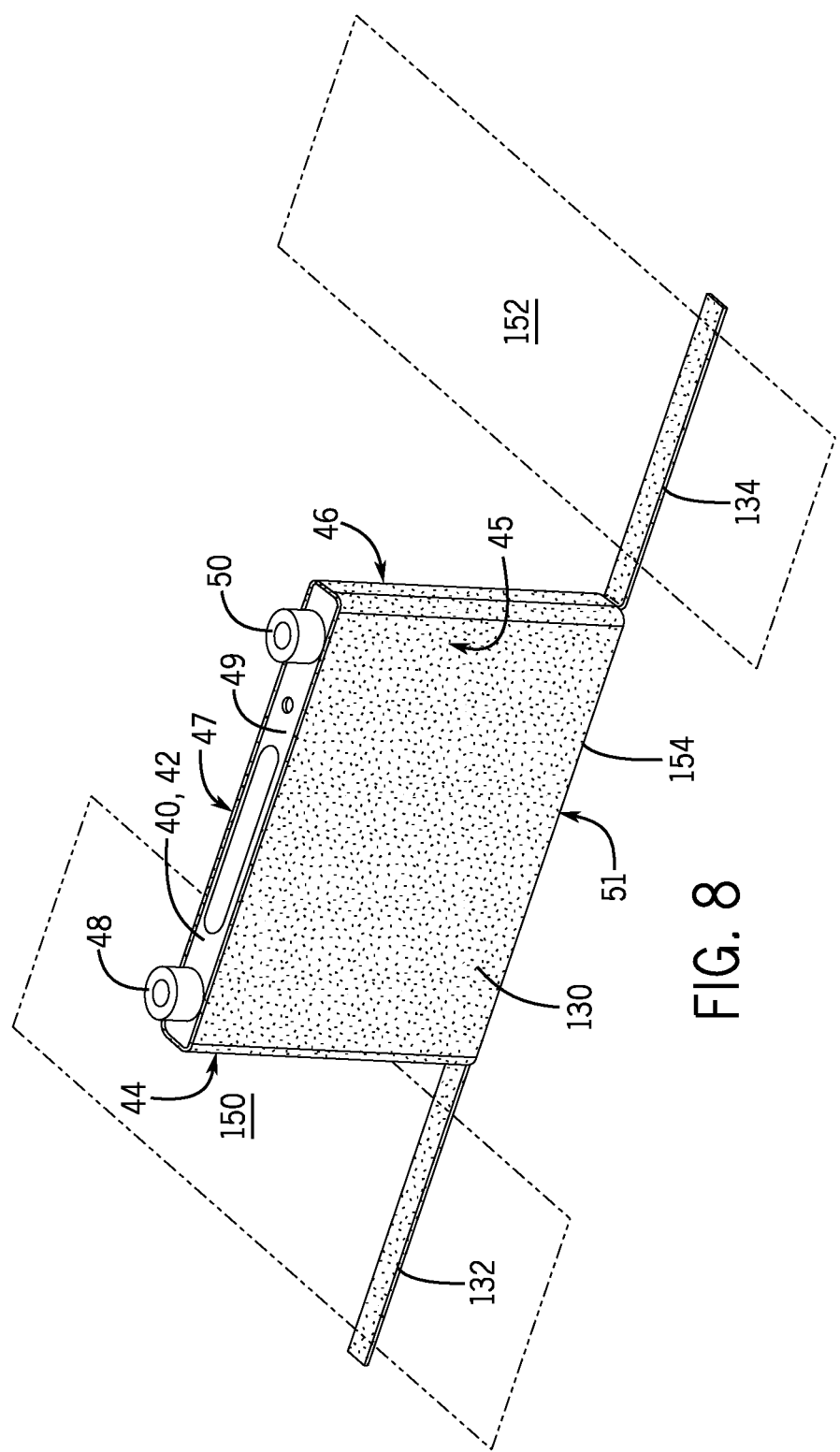
FIG. 8 is a schematic diagram illustrating a prismatic battery cell disposed in the thermal pouch of FIG. 7, in accordance with an embodiment of the present approach.

FIG. 8 is a schematic diagram illustrating an embodiment of a prismatic battery cell 40 (having rounded end portions 44 and 46) disposed within the embodiment of a thermal pouch 130 of FIG. 7. As used herein, a "thermal assembly" is a combination of a battery cell and its associated thermal pouch, in accordance with present techniques. For the thermal assembly illustrated in FIG. 8, the thermal pouch 130 snuggly wraps and covers the end portions 44 and 46 and the side portions 45 and 47 of the prismatic battery cell 40. As mentioned above, the top portion 49 and the bottom portion 51 of the prismatic battery cell 40 are not covered by the thermal pouch 130. As such, the terminals 48 and 50 of the prismatic battery cell 40, as well as any other features (e.g., vents) disposed on the top portion 49 of the prismatic battery cell 40, are not covered or blocked by the carbon-based thermal film when the prismatic battery cell 40 is disposed in the thermal pouch 130. Additionally, for the illustrated embodiment, the bottom portion 51 of the prismatic battery cell 40 is not covered by the carbon-based thermal film of the thermal pouch 130, which may allow the bottom portion 51 of the prismatic battery cell 40 contact an internal surface of the packaging of the battery module in certain embodiments.

Additionally, FIG. 8 illustrates two thermal management features 150 and 152 represented by dashed rectangles disposed below the prismatic battery cell 40 and the thermal pouch 130. The illustrated thermal management features 150 and 152 may be heat sinks, cooling plates, or other suitable thermal management features that may be incorporated into the battery module. In other embodiments, thermal management features may extend across the width of the prismatic battery cell 40 and may directly, physically contact the bottom portion 51 of the prismatic battery cell 40. As illustrated in FIG. 8, only the back side 154 of the carbon-based thermal film is visible, and the opposite (i.e., contacting) side of the carbon-based thermal film contacts both the packaging 42 of the prismatic battery cell 40 and the thermal management features 150 and 152. During operation, the contacting side of the carbon-based thermal film (opposite the visible back side 154 of the carbon-based thermal film) of the thermal pouch 130 contacts and receives heat from the packaging 42 of the prismatic battery cell 40, transfers the heat along the plane of the carbon-based thermal film until it reaches the flaps 132 and 134, and then transfers the heat to the thermal management features 150 and 152 for removal from the battery module such that the heat does not traverse the entire thickness of the carbon-based thermal film.

Figure 9:
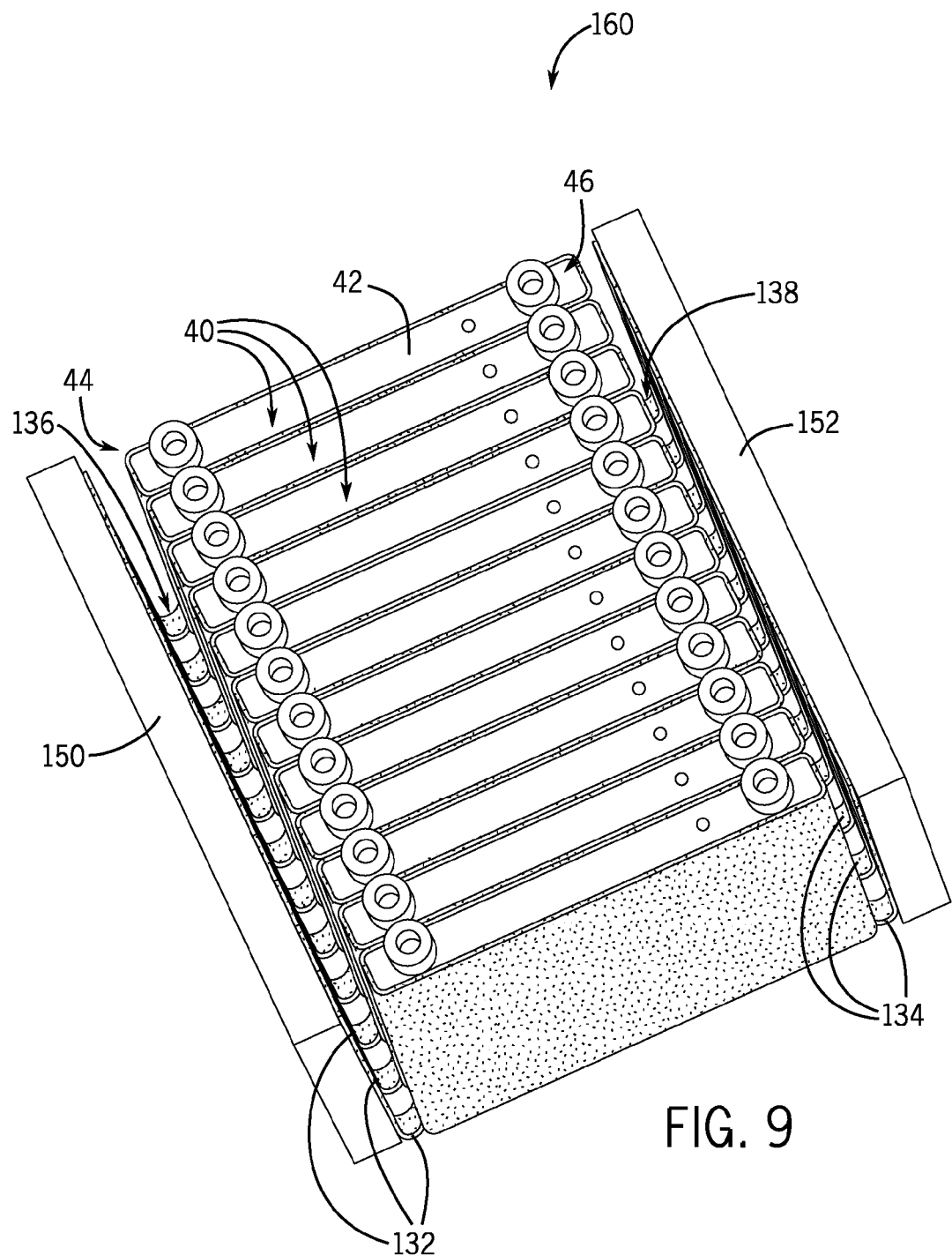
FIG. 9 is a perspective view of a portion of a battery module that includes a number of prismatic battery cells that are each disposed in the thermal pouch of FIG. 7, in accordance with an embodiment of the present approach.

FIG. 9 is a perspective view illustrating a portion of a battery module 160 having a number of prismatic battery cells 40, each disposed within an embodiment of the thermal pouch 130 illustrated in FIG. 7. The portion of the battery module 160 illustrated in FIG. 9 includes two thermal management features 150 and 152 disposed substantially parallel to the end portions 44 and 46 of the prismatic battery cells 40. Accordingly, the flaps 132 and 134 of each of the thermal pouches 130 include the curves 136 and 138 such that they are positioned substantially parallel to the surface of the thermal management features 150 and 152, respectively. As set forth above, the thermal pouches 130 are designed such that the same side of the carbon-based thermal film is in contact with both the packaging 42 of the prismatic battery cell 40 and the thermal management features 150 and 152. In other words, the thermal pouches 130 provide continuous thermal pathways that extend between each of the prismatic battery cells 40 and the thermal management features 150 and 152, wherein these thermal pathways do not involve the heat traversing the entire thickness of the carbon-based thermal film. It may also be noted that the curves 136 and 138 may provide a subtle spring force that causes the flaps 132 and 134 to press against the surfaces of the thermal management features 150 and 152, respectively, as the carbon-based thermal film attempts to flatten out the curves 136 and 138 to recover its initial flat conformation. As such, this spring force may maintain contact between the flaps 132 and 134 and the thermal management features 150 and 152, respectively, particularly as the prismatic battery cells 40 and/or the thermal pouches 130 repeatedly expand and contract during operation of the battery module 160. It may be appreciated that since the thermal pouches 130 conform to packaging 42 of the battery cells 40, the battery module 160 does not utilize thermal gap pads or similar materials along these thermal pathways, as are used in other battery modules.

FIGS. 10A-D are schematic diagrams illustrating an embodiment of a method for manufacturing the thermal pouch 130 from a single sheet of the carbon-based thermal film. In FIG. 10A, a prismatic battery cell 40 is positioned on the sheet 180 of carbon-based thermal film. In other embodiments, measurements of the prismatic battery cell 40 or a template or stand-in cell may be used to determine the appropriate dimensions for the thermal pouch 130. As illustrated in FIG. 10A, the sheet 180 of the carbon-based thermal film may be cut (e.g., using scissors or a utility knife) along the indicated dashed lines to provide the flaps 132 and 134. For the thermal pouch 130, the widths 182 of the flaps 132 and 134 may be substantially the same as the thickness 56 of the prismatic battery cell 40, the width 184 may be substantially the same as the width 54 of the prismatic battery cell 40, and the length 186 of the flaps 132 and 134 may be substantially the same as the height 52 of the prismatic battery cell 40, according to the dimensions illustrated in FIG. 3. Further, once the sheet 180 of the carbon-based thermal film has been appropriately cut, the film may be wrapped around the battery cell 40, as indicated by the arrows 188, to provide the configuration illustrated by FIG. 10B.

Next, as indicated by the arrows 190 of FIG. 10B, the flaps 132 and 134 may be bent or folded toward the top portion 49 of the battery cell 40 to provide the configuration illustrated by FIG. 10C. If it is desirable to contact a thermal management feature below the prismatic battery cell 40, as illustrated in FIG. 8, then the thermal pouch 130 is complete at this stage. However, if the thermal management features are disposed along the end portions 44 and 46 of the prismatic battery cells 40, as illustrated in FIG. 9, then the flaps 132 and 134 may be further bent or folded as illustrated by the arrows 192 of FIG. 10C to provide the configuration illustrated by FIG. 10D. It may be appreciated that the process illustrated by FIGS. 10A-D is merely an example, and that, in other embodiments, the steps illustrated by FIGS. 10A-D may be performed in other orders.

It may be noted that the seam 194 formed by the meeting of the edges of the sheet 180 represents a discontinuity in the otherwise continuous thermal pouch 130. However, it may be noted that there still exists an uninterrupted, continuous surface of the carbon-based thermal film that extends from any point on the surface of the packaging 42 of the battery cell 40 that is covered by the thermal pouch 130 to the distal ends both of the flaps 132 and 134, despite the presence of this seam 194. In certain embodiments, the thermal pouch 130 may be adhered (e.g., to itself and/or to the packaging of the battery cell 40) to secure the thermal pouch 130 around the prismatic battery cell 40. Furthermore, in other embodiments the seam 194 may be differently positioned based on the initial position of the prismatic battery cell 40 on the sheet 180 of the carbon-based thermal film.

FIGS. 11A and 11B are schematic diagrams illustrating an embodiment of a method for manufacturing another embodiment of a thermal pouch 200 from a single sheet 180 of the carbon-based thermal film. FIG. 11A is a top-down view of a prismatic battery cell 40 positioned on a sheet 180 of carbon-based thermal film. As illustrated in FIG. 11A, the sheet 180 of carbon-based thermal film may be cut along the indicated dashed lines. For the thermal pouch 200, the lengths 202 may be substantially the same as the thickness 56 of the prismatic battery cell 40, and the length 204 may be substantially the same as the height 52 of the prismatic battery cell 40, according to the dimensions illustrated in FIG. 3. Further, once the sheet 180 of the carbon-based thermal film has been appropriately cut, the film may be folded up around the side portions 45 and 47 and around the end portions 44 and 46 of the battery cell 40 to provide the configuration illustrated by FIG. 11B. Next, as indicated by the arrows 206 of FIG. 11B, the flaps 208 and 210 may be bent or folded away from the prismatic battery cell 40 to contact thermal management features disposed along the end portions 44 and 46 of the prismatic battery cell 40 so that the same side of the carbon-based thermal film contacts both the packaging 42 of the prismatic battery cell 40 and the thermal management feature. As with the curves 136 and 138 discussed above with respect to the embodiment of the thermal pouch 130 illustrated in FIG. 7, the resulting curves imparted to the flaps 208 and 210 after being bent or folded away from the prismatic battery cell 40 may provide a spring force that maintains contact between the thermal pouch 200 and the thermal management features of the battery module.

FIG. 12 is a perspective view illustrating an embodiment of a thermal pouch 220 made from a carbon-based thermal film for use with a cylindrical battery cell 60, as illustrated in FIG. 4. Accordingly, the thermal pouch 220 illustrated in FIG. 12 includes a cylindrical portion 222 having generally the same cylindrical shape as the cylindrical battery cell 60 illustrated in FIG. 4. Additionally, the thermal pouch 220 includes flaps 224 and 226 that extend outwardly from the bottom of the cylindrical portion 222. For the thermal pouch 220 illustrated in FIG. 12, the top and bottom portions 228 and 230 are open (i.e., not covered by the carbon-based thermal film). The thermal pouch 220 of FIG. 12 includes a single seam 232, discussed below. It may be appreciated that, like the thermal pouches discussed above, the bottom surfaces of the flaps 224 and 226 (not visible) that are designed to contact the thermal management feature of the battery module (as discussed below) and the surface 234 that contacts the packaging 62 of the cylindrical battery cell 60 are formed from a common side of the carbon-based thermal film for the illustrated thermal pouch 220.

FIG. 13 is a schematic diagram illustrating an embodiment of a cylindrical battery cell 60 disposed within the embodiment of the thermal pouch 220 of FIG. 12. Additionally, the thermal assembly illustrated in FIG. 13 includes two thermal management features 150 and 152 represented by dashed rectangles disposed below the cylindrical battery cell 60 and the thermal pouch 220. In other embodiments, a thermal management feature may extend under the cylindrical battery cell 60 and may directly, physically contact the cylindrical battery cell 60. As illustrated in FIG. 13, only the back side 236 of the carbon-based thermal film is visible, and the opposite side of the carbon-based thermal film (not visible) contacts both the packaging 62 of the prismatic battery cell 60 and the thermal management features 150 and 152. During operation, the contacting side of the carbon-based thermal film (e.g., opposite the visible back side 154 of the carbon-based thermal film) contacts and receives heat from the packaging 62 of the prismatic battery cell 60, transfers the heat along the plane of the carbon-based thermal film until it reaches the flaps 224 and 226, and then transfers the heat to the thermal management features 150 and 152. Additionally, as with certain thermal pouches discussed above, the flaps 224 and 226 of the thermal pouch 220 illustrated in FIG. 13 have a curve 238 and 240, respectively, which may provide a spring force that maintains contact between the flaps 224 and 226 and the thermal management features 150 and 152 of a battery module.

FIGS. 14A-C are schematic diagrams illustrating an embodiment of a method for manufacturing the thermal pouch 220 from a single, continuous carbon-based thermal film. In FIG. 14A, a cylindrical battery cell 60 is positioned on the sheet 180 of carbon-based thermal film. In other embodiments, measurements of the prismatic battery cell 60 or a template or stand-in cell may be used to determine the appropriate dimensions for the thermal pouch 220. As illustrated in FIG. 14A, the sheet 180 of carbon-based thermal film may be cut along the indicated dashed line 250 to provide the flaps 224 and 226. For the thermal pouch 220, the widths 252 of the flaps 224 and 226 may be substantially the same as approximately half the circumference 72 of the cylindrical battery cell 60, and the length 254 of the flaps 224 and 226 may be substantially the same as the height 68 of the cylindrical battery cell 60, according to the dimensions illustrated in FIG. 4. Further, once the sheet 180 of the carbon-based thermal film has been appropriately cut, the film may be wrapped around the cylindrical battery cell 60, as indicated by the arrows 256, to provide the configuration illustrated by FIG. 14B. Next, as indicated by the arrows 258 of FIG. 14B, the flaps 224 and 226 may be bent or folded to provide the configuration illustrated by FIG. 10C. Similar to the thermal pouch 130 of FIG. 7, in certain embodiments, the flaps 224 and 226 may be further bent or folded upwards to be substantially parallel to the height 68 of the cylindrical battery cell 60 to contact thermal management features disposed along the sides of the cylindrical battery cell 60. It may be appreciated that the process illustrated by FIGS. 14A-C is merely an example and that, in other embodiments, the steps illustrated by FIGS. 14A-C may be performed in other orders.

It may be noted that the seam 232 formed by the meeting of the edges of the sheet 180 of the carbon-based thermal film represents a discontinuity in the otherwise thermal pouch 200. However, it may be noted that there still exists an uninterrupted, continuous surface of the carbon-based thermal film that extends from any point on the surface of the packaging 62 of the cylindrical battery cell 60 that is covered by the thermal pouch 220 to the distal ends both of the flaps 224 and 226, despite the presence of this seam 232. In certain embodiments, the thermal pouch 130 may be adhered (e.g., to itself to form a seam, and/or to the packaging 62 of the battery cell 60) to secure the thermal pouch 220 around the cylindrical battery cell 60.

FIG. 15 is a perspective view illustrating a pouch battery cell 80 alongside an embodiment of a thermal pouch 260 made from a carbon-based thermal film for use with such pouch battery cells. The thermal pouch 260 is designed to be stacked against the pouch battery cell 80, as illustrated in FIG. 15. The illustrated thermal pouch 260 includes a rectangular portion 262 that is designed to contact one side (e.g., the back side, not shown) of the packaging 82 of the pouch battery cell 80. As such, for the illustrated embodiment, the dimensions of the rectangular portion 262 may correspond to the length 88 and the width 90 of the pouch battery cell 80, as illustrated in FIG. 5. In other embodiments, the thermal pouch 260 may include an additional rectangular portion of similar dimensions extending from the edge 264 that is designed to be folded over to contact the front side 266 of the packaging 82 of the pouch battery cell 80.

The thermal pouch 260 illustrated in FIG. 15 is folded, as illustrated by the arrow 268, along the edge 270 to form a single flap 272. As such, for the illustrated embodiment, the width 273 of the flap 272 may correspond to the thickness 92 of the pouch battery cell 80, as illustrated in FIG. 5. In other embodiments, there may be an additional or alternative flap positioned along the opposite edge 264 of the thermal pouch 260. It may be appreciated that, like the thermal pouches discussed above, the surface of the flap 272 that is designed to contact the thermal management feature of the battery module and the surface of the rectangular portion 262 that is designed to contact the packaging 82 of the pouch battery cell 80 are formed from a common side of the carbon-based thermal film.

FIG. 16 is a perspective view illustrating a portion of a battery module 280 that includes a stack 282 of pouch battery cells 80, each having an embodiment of a thermal pouch 260 illustrated in FIG. 15. For the embodiment illustrated in FIG. 16, the flaps 272 of each of the thermal pouches 260 are positioned to run parallel with one another along the surface of a thermal management feature of the battery module (not shown). Additional, as with certain flaps discussed above, in certain embodiments, the folded edges 270 of the thermal pouches 260 may provide a spring force that may aid in maintaining contact between the flaps 272 and the thermal management feature, despite thermal expansion and contraction of the pouch battery cell 80, the thermal pouch 260, or a combination thereof.

The technical effects of the present disclosure include enabling the use of a single, continuous carbon-based thermal film to form a thermal pouch around the packaging of a battery cell, such as a prismatic, cylindrical, or pouch battery cell of a battery module. These thermal pouches enable efficient in-plane conduction of heat by the carbon-based thermal film by ensuring that the same surface of the thermal film is in direct contact with both the packaging of the battery cell and the thermal management feature of the battery module. Accordingly, the disclosed designs enable good heat conduction, good electrical resistance, enable greater robustness toward battery cell variability, and enable greater robustness toward expansion and contraction of the battery cell during operation. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc., without materially departing from the novel teachings and advantages of the subject matter. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
a plurality of lithium ion battery cells disposed within a packaging of the battery module, wherein each respective lithium ion battery cell of the plurality of lithium ion battery cells includes:
a respective metallic battery cell packaging comprising one or more side or end portions; and
a respective carbon-based thermal film formed into a respective thermal pouch that covers substantially all of the one or more side and end portions of the respective metallic battery cell packaging; and
at least one thermal management feature associated with the packaging of the battery module, wherein the plurality of lithium ion battery cells are not in direct contact with the at least one thermal management feature of the battery module, and wherein the thermal management feature is configured to receive heat from the plurality of lithium ion battery cells, via the respective thermal pouches of the plurality of lithium ion battery cells, and to remove the heat from the packaging of the battery module;
wherein each respective thermal pouch comprises a carbon-based thermal film having a first side that directly contacts all of the one or more side and end portions of the respective metallic battery cell packaging, wherein each respective thermal pouch comprises one or more flaps extending from a bottom portion of the respective thermal pouch and directly contacting the at least one thermal management feature of the battery module with the first side of the carbon-based film.

2. The battery module of claim 1, wherein each of the plurality of lithium ion battery cells are in thermal communication with, and electrically isolated from, the at least one thermal management feature of the battery module via the respective thermal pouches.

3. The battery module of claim 1, wherein the at least one thermal management feature comprises a heat sink or a cooling plate.

4. The battery module of claim 1, wherein the battery module does not include phase-change materials or thermal gap pads.

5. The battery module of claim 1, wherein each respective lithium ion battery cell of the plurality of lithium ion battery cells is a cylindrical lithium ion battery cell having a respective top portion that includes terminals, a respective bottom portion, and a respective round side portion, wherein only the respective round side portion is substantially covered by the respective thermal pouch.

6. The battery module of claim 1, wherein the battery module is configured to communicatively couple and provide power to an xEV, wherein the xEV is a micro-hybrid or a Stop-Start system that is powered by the battery module.

7. A battery module, comprising:
a lithium ion battery cell comprising a metallic packaging having one or more side or end portions disposed in a thermal pouch formed from a carbon-based thermal film, wherein the carbon-based thermal film includes a side that both contacts and substantially covers all side and end portions of the metallic packaging of the lithium ion battery cell and forms a contact surface of a flap extending from a bottom portion of the thermal pouch, wherein the lithium ion battery cell and the thermal pouch are together disposed inside a packaging of the battery module, and wherein the contact surface of the flap of the thermal pouch is disposed against an internal surface of a thermal management feature associated with the packaging of the battery module, wherein the lithium ion battery cell is not in direct contact with the thermal management feature of the battery module.

8. The battery module of claim 7, wherein the carbon-based thermal film is a single, continuous sheet that is cut, folded, and/or bent to form the thermal pouch.

9. The battery module of claim 7, wherein the carbon-based thermal film is conformed to the at least one surface of the packaging of the lithium ion battery cell.

10. The battery module of claim 7, comprising an adhesive or a thermal paste disposed between the carbon-based thermal film and the packaging of the lithium ion battery cell and disposed between the carbon-based thermal film and the internal surface of the thermal management feature.

11. The battery module of claim 7, wherein a weld or an adhesive adheres portions of the carbon-based thermal film to other portions of the carbon-based thermal film to form seams of the thermal pouch.

12. The battery module of claim 7, wherein the contact surface of the flap is conformed to the surface of the internal surface of the thermal management feature.

13. A thermal assembly for a battery cell, comprising:
the battery cell with a metallic battery cell packaging comprising one or more side or end portions; and
a thermal pouch comprising a continuous carbon-based thermal film having a first side, wherein the thermal pouch is configured to contact and substantially cover all side and end portions of the metallic battery cell packaging, and wherein the thermal pouch comprises one or more flaps extending from a bottom portion of the thermal pouch and configured to contact one or more thermal management features of a battery module with the first side of the carbon-based thermal film, wherein the first side of the carbon-based thermal film is configured to provide uninterrupted thermal pathways along the first side of the carbon-based thermal film between the metallic battery cell packaging and the one or more thermal management features of the battery module, and wherein the carbon-based thermal film is configured to physically isolate the metallic battery cell packaging from the one or more thermal management features.

14. The thermal assembly of claim 13, wherein the carbon-based thermal film comprises one or more of: graphene, graphite, compressed exfoliated graphite, a graphitized polyimide, a graphite-based laminate, or a pyrolytic graphite sheet (PGS).

15. The thermal assembly of claim 13, wherein the carbon-based thermal film comprises a plurality of layers, and wherein the plurality of layers comprise thermally conductive carbon layers, support layers, adhesive layers, electrically insulating layers, or a combination thereof.

16. The thermal assembly of claim 13, wherein the thermal conductivity along the plane of the carbon-based thermal film is at least an order of magnitude greater than the thermal conductivity across the thickness of the carbon-based thermal film.

17. The thermal assembly of claim 13, wherein the carbon-based thermal film is not substantially electrically conductive across the thickness of the carbon-based thermal film.

18. The thermal assembly of claim 13, wherein the one or more flaps each comprise a bend that is configured to provide a spring force away from the battery cell and toward the one or more thermal management features to maintain contact between the one or more flaps and the one or more thermal management features, respectively, despite thermal expansion or thermal contraction of the thermal pouch, the battery cell, or both.

19. The thermal assembly of claim 13, wherein one or more dimensions of the one or more flaps correspond to a height of the metallic battery cell packaging.

20. The thermal assembly of claim 13, wherein the thermal pouch covers all except a top portion of the metallic battery cell packaging that includes terminals of the battery cell.

21. The thermal assembly of claim 13, wherein the thermal pouch is affixed to the metallic battery cell packaging using an adhesive or a thermal paste.

22. The battery module of claim 1, wherein each respective carbon-based thermal film directly contacts the respective metallic battery cell packaging of the respective lithium ion battery cell and not the respective metallic battery cell packaging of any other of the plurality of lithium ion battery cells.

23. The battery module of claim 1, wherein each respective lithium ion battery cell of the plurality of lithium ion battery cells is a prismatic lithium ion battery cell having a respective top portion that includes terminals, a respective bottom portion, a first respective side portion, a second respective side portion, a first respective end portion, and a second respective end portion, wherein the first and second respective side portions, the first and second respective end portions, and the respective bottom portion are all substantially covered by the respective thermal pouch.

24. The thermal assembly of claim 13, wherein the battery cell is a cylindrical lithium ion battery cell and wherein the one or more flaps comprise a first flap and a second flap, each having a width that is substantially the same as a diameter of the cylindrical lithium ion battery cell and a length that is substantially the same as a height of the cylindrical lithium ion battery cell.

25. The thermal assembly of claim 13, wherein the battery cell is a prismatic lithium ion battery cell and wherein the one or more flaps comprise a first flap and a second flap, each having a width that is substantially the same as a thickness of the prismatic lithium ion battery cell and a length that is substantially the same as a height of the prismatic lithium ion battery cell.

* * * * *